Figure 1:
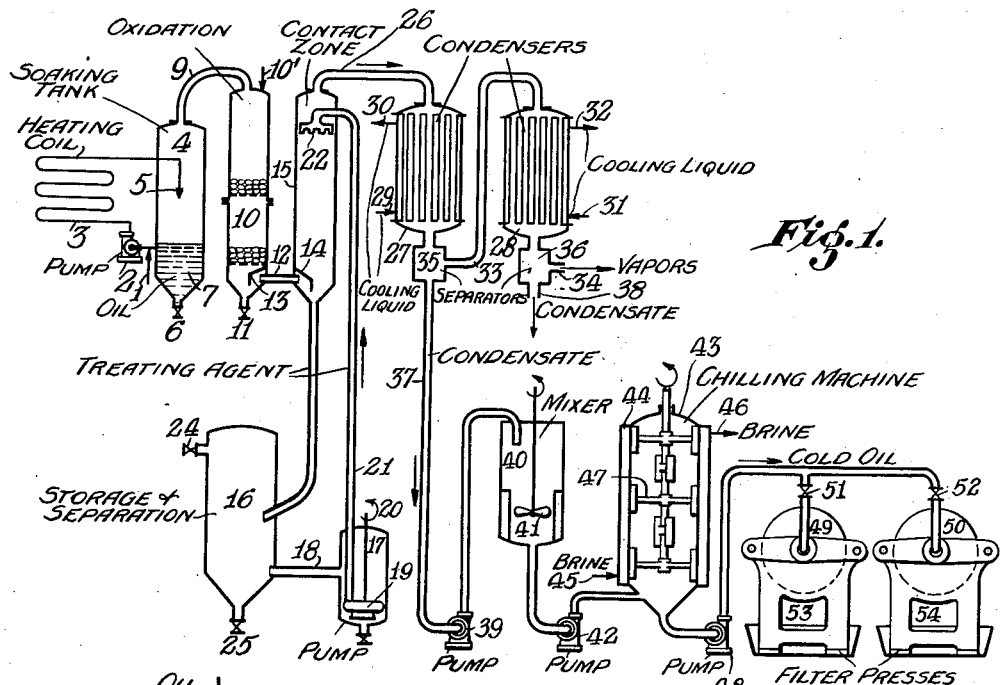

March 30, 1937. J. F. WAIT 2,075,151

PROCESS OF FORMING WAX AND PRODUCT THEREFROM

Filed April 29, 1933

Inventor:
Justin F. Wait
by
Attorney

Patented Mar. 30, 1937

2,075,151

UNITED STATES PATENT OFFICE 2,075,151

PROCESS OF FORMING WAX AND PRODUCT THEREFROM

Justin F. Wait, New York, N. Y.

Application April 29, 1933, Serial No. 668,499

14 Claims. (Cl. 196—21)

This invention relates to improvements in methods of refining oil to remove wax inherent therein and to treat wax to promote rearrangement. It further pertains to improvements in production of waxy substance by rearrangement of oil and products obtained thereby. It may be applied to petroleum and other oils for procuring a good form of wax and to improve the quality of the oil from which it is derived and to form oil from wax. It is applicable to concentration of two substances with respect to one another and to the concentration of one with respect to a multiplicity of others. Thus, in applying my invention to a hydrocarbon such as petroleum a group of specific compounds may be concentrated with respect to a single hydrocarbon as for example in concentrating the wax-like substances a lubricant and so yielding a "non-freezing" type of lubricant, which has been concentrated as regards non-waxy substances, and a wax which may be separated from the lubricant. This application is in part divisional of or related to my applications Ser. No. 482,267, 489,700, 613,150, 613,080.

The usual method of refining petroleum involves refining oil by methods such as treatment with sulfuric acid and adsorptive clay-like substance and chilling of the lubricating stock to precipitate the wax or wax-like substances. Such stock is generally heavily colored and contains colloidal or other substances which appear to inhibit separation of the wax and lower the purity thereof. The precipitated wax may be separated as by means of a filter or a centrifuge. The crude wax is then "sweat" to yield a more pure form and to remove oil therefrom.

My invention involves an unusually pure form of such oil which is obtained by special treatment and which insures the production of a better form of wax or more thereof or a better form of oil from which the wax has been separated. It may further involve production of oil of lubricating and lighter ranges from waxy substance. I decrease the viscosity of the oil and eliminate colorful and other impurities. This makes it possible to precipitate and/or separate the wax with greater efficiency.

The wax may be of the crystalline or amorphous type and for purposes of this application I consider some sorts of petroleum jelly as a wax. The lowering of the viscosity, makes it possible to carry on filtration at a greater rate or to settle out portions of wax to a degree of either low or high concentration thereof and with similar rate of separation as by decantage and drainage. Other separating means are similarly improved. In some instances it is possible to separate out more wax than is otherwise possible, due to improved separation brought about by rearrangement or due to formation of waxy substance in a more readily separated form or due to actual formation of waxy substance by rearrangement of a component of oil treated.

The process may be operated to take out the wax in two or more stages. This often facilitates a separation and makes it possible to produce more than one grade of wax from the same oil. Thus coming to a certain point will precipitate out a certain kind of wax which may be readily separated as by small increase in temperature and filtration under that temperature held constant. By combining the steps of rearrangement and multistage separation I am able to produce wax which is substantially colorless as well as wax which is white. This is preferably done by controlling the rearrangement to give a viscosity index of over about 150 while rendering the oil colorless and controlling the point of cut-off of crystallization of each of the stages at the point whereat further precipitation would yield white instead of the colorless wax produceable from the substantially colorless and rearranged oil. By limiting the removal of each stage and growing crystals to a large size the well defined and pure crystals are of higher density while by rearrangement with metal the oil generally decreases in density as the viscosity index is increased. In some instances substantially colorless (and transparent) wax may be obtained by a single stage of precipitation wherein the temperature is very slowly reduced and without the usual quick cooling. With some wax containing oil it is possible to quickly chill and to allow the cooled liquid with but little or slight precipitate to stand until slow crystallization takes place. During this time heat may be abstracted at a low rate.

In separating wax as by filtration a filter-aid or the like may be used. The separation with or without a filter-aid need not be complete but should result in substantial concentration of the wax as regards the oil associated therewith. The wax may subsequently be sweated or otherwise treated to effect purification.

Though the oil is preferably nearly colorless before dewaxing it is sometimes economical to operate the dewaxing step with oil containing up to a color of about .5 to 1.0 on the Lovibond scale (yellow with up to about 10% of red) with a one inch cell. The color has been sufficiently lowered that a fairly high rate of precipitation and/or separation and a much improved product may be obtained. Such rate of precipitation does not however exceed the rate required to grow crystals from about a thirty-second of an inch up to about one inch in their greatest dimension. The rate is further such so as not to exceed between about five percent and about thirty percent by weight of the total mass. Excellent results have been obtained by forming large colorless transparent crystals from nearly colorless oil to the extent of between about one percent and about ten percent of the mass. I have found that with a cooling and crystallization period of from about ten to fifty hours large crystals may be obtained in those indicated amounts. The oil and/or the wax may then be further treated as to further improve the color and crystals from or to lower the viscosity as to otherwise improve properties to meet specific requirements. The waxy portion may be rearranged molecularly and/or caused to react with another substance or it may be mixed with a different substance to yield a lower melting point or other property.

My process may involve other means for effecting separation of portions or substantially all of the associated impurities and either before treatment or after partial treatment or pretreatment by the specific procedure herein described. I have found that if the viscosity of the petroleum is lowered a partial separation of impurities or of waxy substance may be effected. This may be done as by admixture with a miscible liquid such as a lighter hydrocarbon. Heat may be used to assist in lowering the viscosity. My preferred method of lowering viscosity is to limit such lowering most to lower temperatures as may be accomplished by treating oil to increase its viscosity index as indicated in Ser. No. 613,081 and in French Patent No. 756,203.

The velocity of separating as by settling or centrifugal force may be increased as by application of an electrical charge to neutralize that carried by colloidal particles. The effect of gravity may be supplemented by or substituted by the effect of application of an electrical potential. An electric force may be applied as a direct potential or as a magnetic, electrostatic or other means.

An adsorptive agent or other form of clarifier may be used to facilitate separation of the impurities when they are mobile and also to aid filtration or other separating means. This may be done as by agitating diatomaceous or other like substance with the fluid hydrocarbon.

I have found it frequently advantageous to treat the hydrocarbon before contacting the same with such an adsorptive agent. I prefer to utilize adsorptive surface to treat oil residual from distillation which has been treated with alkali metal or the like. Thus very heavy oil may be so treated, lights distilled and the residue contacted with clay-like substance to remove resinified or other substances including those not in solution. The clay-like substance with a small amount of metal may be made residual to high vacuum distillation preferably from a thin film and whereby the adsorptive surfaces further serves as to separate non-volatiles from a heating surface.

Likewise an adsorptive substance which contains an electric charge or one on which one may be formed will sometimes assist in causing the adsorption of impurities. Such a charge may also be formed on the impurity to be adsorbed. For example, if a charge is given to sulphur contained with hydrocarbon in the vapor phase, the same may be moved in magnetic, electric or other field and so concentrated. With a charge, the sulfur particles may be more readily adsorbed as by fuller's earth, activated bentonite and like products especially when the latter are of opposite polarity.

The process may be varied as for separation of some forms of waxes which may be readily accomplished if the distillate containing the same is similarly diluted with a miscible liquid or by other means herein described. This renders a more fluid substance which is in general more susceptible to wax-separating means. The separation may be further facilitated by adding hydrogen or light hydrocarbons which seem to render the waxes in a more "crystalline" form or more readily separable form.

Upon cooling the mixture of oil containing wax and miscible liquid and/or after alteration for formation, wax will be precipitated. If the miscible liquid is water soluble, such as an alcohol, precipitation may be influenced or caused as by addition of water. The precipitation and/or separation may be facilitated as by having present in said mixture particles such as hematite or other heavy substance or one electro or otherwise active. Fuller's earth and similar materials may also be used. If an adsorptive substance such as bentonite is employed, it may be used as a concentrating agent for hydrogen or methane and so cause production of a more "crystalline" or other form.

Such precipitation may also be promoted or influenced by forming an emulsion and causing the non-waxeous portion to initiate crystallization. Wax will then follow therewith in forming crystals. This may be due in part as to concentration of the waxeous substance in the interface of the small particles such as are contained in the emulsion.

By lowering of the viscosity of the oil itself I mean causing molecular rearrangement so that a lower viscosity will result. It may sometimes be found advisable to also add a "diluent" or to add, at one stage or another, a substance which will by itself lower the pour point.

Greater mobility and other properties including low conductivity makes it possible to employ an electric potential to assist in concentrating the precipitable solid matter as above suggested. This kind of oil has not heretofore been prepared nor wax separated therefrom wherefore my method is different from what has heretofore been suggested. The substances yielding appreciable conductivity have in particular been removed or substantially reduced and yield better results and lower operating cost.

Especially controlled and mild oxidation may be used to assist in the alteration and/or removal of certain substances contained in the oil, oxygen being used for this purpose. It is preferably carried out as by the use of a nitrogen-oxygen group which may be attached to a benzene ring. Another method is described in my application Ser. No. 490,331 filed Oct. 21, 1930. The oxygen attaches itself to some portions of the oil and the so formed substance may be removed as by condensation. This phase of my invention makes it possible to obtain further improvement with some oils and/or to produce new products therefrom. The oxidation is carried to a point so that treatment with molten mass containing alkali or other metal will produce an oil which is greatly or appreciably more resistant to oxidation. This point is determined by experimentation with each oil. The subsequent treatment is preferably cut at about a point of maximum resistance to oxidation also determined experimentally.

The waxy portion which has been precipitated by my invention often readily settles out by action of gravity and in this respect it is vastly different from other methods of dewaxing. This is particularly noticeable with some oils in which crystals of about a half an inch or greater in size are formed. This is probably due to the more pure form of the oil and/or the wax or a lower specific gravity of the oil and the increased density of the more pure wax, frequently obtained, or lower viscosity or probably combination of such reasons. In general treated oils with about the same viscosity at about 350° F. to 450° F. as that of untreated oils have from about 1% to about 5% increase in the Baumé value.

With some oils I have been able to increase the waxy component by heavy cracking such as would yield from about 20% to about 50% of oil of gasoline range out of heavier oil. As an example a yield of about 45% of gasoline range will generally result in a residual mass of about 30% yield which is of increased waxy component due to rearrangement. I prefer to apply alkali metal to such oil while it is at the cracking temperature which may be subsequent to the period of forming the above indicated yields of gasoline and to the extent of reducing the color to below about the above indicated values. Preferred results are obtainable with substantially colorless oil of a color below about 1.0 Lovibond using an 18" cell. It is practical with some oils to reduce the color to below about .5 (with 18" cell) which yields white wax in some instances and large colorless wax crystals in other instances.

In treating wax as by alkali metal at between about 250° C. and 450° C. it appears that a marked rearrangement takes place. The molecular weight of a portion appears to be reduced to an average of roughly half. This portion may be from about 10% to about 50% or more of the total wax treated. The remaining portion is a waxy oil from which wax may be separated to produce an excellent grade of lubricating oil. If the mild oxidation is applied to such oil with a light treatment with metal at between about 200° C. and 400° C. an oil resistant to oxidation and of unusually high demulsibility is obtained. Mild oxidation may be beneficially applied before rearranging the wax. I prefer to similarly further treat wax separated from the so formed oil. The light oil may be in part of the mineral seal range and somewhat lighter. Mild oxidation and metal treatment thereof reduces carbon and gum formation to a negligible value.

A feature of oil produced by my process is the low carbon deposited on Conradson test and more particularly on use in a gasoline engine. The Conradson value of oil of a viscosity of between about 40 and about 50 at 210° F. is a trace after being considerably below 0.05 and in fact zero for all practical purposes. Such oils have a viscosity index of from about 100 to above about 150.

A source of waxy substance so treated may be wax obtained from heavy oil treated with alkali or other active metal. It may thus be that from metal treated oil subsequently treated with adsorptive surface in which case the waxy substance may be appreciably colored. Green or yellowish wax or petrolatum may be used to produce colorless or substantially white wax. The time of contact at the indicated temperature is preferably short and within about a minute or so when the oil is in vapor form. When in liquid form a period up to about twenty hours may be required although improvement may be realized in about an hour or so. With liquid treatment and some oils or waxes I prefer to use a temperature of about 300° C. or about 350° C. and to use pressures of between about 100 and about 500 pounds especially when adding gases or vapors by reaction.

It is sometimes advantageous to mix waxy substance or oil high in wax with another oil, preferably an oil like or lighter than a light lubricant and to treat vapors of such mixture. The light oil may be cooled to between about −20° C. and −50° C. to produce wax of high grade as indicated or a portion of the added oil may be separated before to facilitate wax formation.

Figure 2:
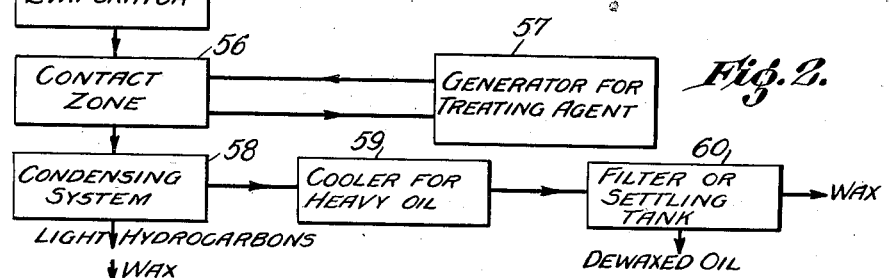
Figure 3:
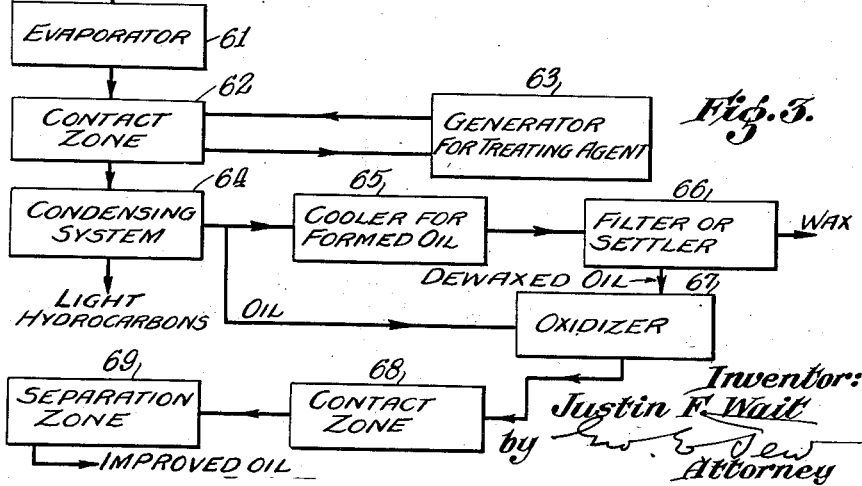

It is necessary to vary the procedure with each oil because oils, supposedly of the same sort, vary considerably in chemical composition. A schematic illustration of a system of apparatus in which the general process may be carried out is illustrated in Figs. 1, 2, and 3 of the accompanying drawing.

Oil, which may have received preliminary treatment, is passed as by means of line 1 into pump 2 whereby it is forced through pipe heater 3 and into chamber 4. A nozzle at 5 may be used to distribute the hot liquid which would fall to a liquid surface below 6 with partial evaporation and separation of liquid from vapor. With oils to be used for lubrication, chamber 4 would be under vacuum while heater 3 could be under the same or other pressure. An absolute pressure of within about 1" of mercury is suitable for many oils. The body of liquid 7 may be returned or recycled, through 3 or treated as with a metal with an alkali metal within 4 or external thereto, and, if desired, before recycling. The outlet 6 may be used for discharge of accumulated amounts of oil as for sludge removal or other purpose. A mechanical agitator or air coil and/or temperature control means may be provided for vessel 4 and alkali metal may be applied therein or in the pipe still or both. The oil of vessel 4 may be flowed to a separate treating vessel to apply the metal.

A vapor line 9 connects with receiver 10 wherein a catalytic or active substance may be maintained such as a metallic oxide suitable for oxidizing or other substance to mildly oxidize the oil the same being supported in the usual manner. Two or more such agents may be used as indicated and to produce various results. For example the lower portion may contain a claylike substance at the surface of which impurities or other material, to be separated, may be deposited and/or accumulated and removed as by means of outlet 11. The line 12 with protecting baffles 13 and 14 will convey vapors to the contacting or condensing tower 15 also provided with temperature control means.

A molten metal with an unpaired electron, such as sodium, may be stored in vessels 16 and 17 connected by line 18. A pump 19 driven as by shaft 20 may be used to recirculate such metal through line 21 distributor 22 and return 23. Such metal with its "ever-fresh" surface contacts with the oil vapors and causes molecular rearrangement of portions thereof. The metal is preferably freshly formed. It may be in association with freshly electrolyzed hydroxide, chloride or other salt of a metal. In this manner I use the treating agent in special active form. Such action may be carried out in conjunction with the oxidation which may be brought about as by introducing air as at 10' into vessel 10 near inlet 9. A condensation or other step may be applied before such oxidation and/or in multiple wherein different temperatures of treating agent or different agents or different mild degrees of oxidation may be utilized depending upon the oil and the results desired.

In general, the metal or compound with metal returning to vessel 16, will carry with it certain condensed portions which may be tarry or resin-like in appearance. This may be separated as by decantation through outlet 24 or as by drainage through outlet 25. This substance often has considerable value and may be purified and used as for protecting coatings or as otherwise desired. The molten metal may be otherwise treated as by passing through an electrolytic cell not shown to provide make-up and for other purpose.

The treated vapors may pass through outlet 26 to condensers 27 and 28 with temperature control means 29, 30, 31, and 32 and outlets for gaseous substances 33 and 34. Separators 35 and 36 with liquid outlets 37 and 38 may be used to dispose of separated liquid. The condensed portions from 35 may pass through pump 39 to vessel 40 wherein it may be treated as with a filter-aid efficient contact being had by reason of agitator 41. Temperature control means, not illustrated, is generally preferred.

The so-treated oil or oil from another source may then be passed through pump 42 and into the chilling machine 43 provided with temperature control device such as jacket 44 and lines 45 and 46. Agitator 47 may be used to insure good heat transfer and precipitation of waxy material. The mass may be cooled as to about −15° F. then raised to about −5° F. and passed through pump 48 to the wax filter 49 and 50 with control valves 51 and 52 and drip or drain pans 53 and 54. The oil may be quickly cooled as in a pipe unit and flowed to a crystallizing basin not shown or into vessel 43 which would then abstract less heat and agitate but slightly to avoid excessive cooling rate and breakage of crystals.

Parts of the system may be used in multiple, for example, there may be two or more sets of vessels 15, 16 and 17 or their equivalent and these may contain different metals or alloys or suspensions or solutions of such metals or different temperatures or both. Such mixtures as were provided for in my applications Ser. No. 608,347 filed Dec. 21, 1922, No. 385,597 filed Aug. 13, 1929 and No. 482,267 filed Sept. 16, 1930 may be utilized in such or nearly equivalent apparatus and to influence reaction means. My French Patent No. 755,875 also shows means for producing the treating agent while French Patent No. 756,203 shows general procedure for applying the treating agents to oil which may be under high vacuum when being treated in the vapor phase. Molten salts of such metals such as sodium hydroxide may be used with oxygen containing gaseous fluid or compound and oxidation may then be carried out in this sort of equipment rather than that of vessel 10.

The precipitated wax may be washed during filtration or resludged or otherwise treated for purification. Oil formed by rearranging wax has been found desirable in some instances and preferably as a nearly saturated solution of wax at the temperature of washing or other treatment. With the removal of impurities and lowering of the viscosity and color the resulting product may be produced as of very high purity and with high melting point. Forms of lower melting point ordinarily of less value may be retreated as by oxidation and/or metal treatment to yield a lubricant of special properties as by treatment in a manner indicated. When this is mixed with another selected lubricant improved characteristics are obtained for example the pour point may be substantially lowered.

In applying my process commercially, as to the treatment of petroleum distillate, advantage may be taken of the fact that the hydrocarbon to be treated is at one or more stages already in the vapor form. For example a hydrocarbon mixture such as the vaporous fluid from a cracking process is frequently at about 400° C. and sometimes considerably in excess thereof. I thus utilize the state of excitation and apply the treatment to active vapors and before the usual rearrangement occurs. Similarly the residue from such process may be treated at once.

Hydrocarbon in this form may be passed through my process with little expenditure for heat as would otherwise be required for evaporation. A multiplicity of treating zones may be used and held at gradient temperatures and heat caused to pass from the vapors into the fused alkaline compound held in one or more stages or from the metal into the vapors. Heat may be applied to some of the treating stages to overcome radiation or for other purposes.

In treating in a multistage system the molten compound may pass from one stage to a second stage, preferably a preceding stage as regards oil treated before it is treated for separation of impurities or before it is reactivated as by electrolysis or as by metal addition. The temperature may be raised or lowered as it flows to the second stage. Relatively inert mineral oil may be used to remove collections from recycled molten mass or from molten mass passed from one zone to another. To economically produce the indicated results multistage treatment is often necessary. In general I prefer to treat first with molten alkali hydroxide or as with molten aluminum chloride dissolved in other chlorides or hydroxides or other salts and to increase the alkali metal or free aluminum content in successive stages. One of the later stages may be of nearly pure alkali metal. The final contact after oxidation as with oil formed from wax is preferably very short or of molten mass low in alkali metal. Experiments or tests must be made to determine the combination which will produce the best results in view of the costs and value of the output. Such combination generally yields much lower costs and better quality than is obtainable with a single contact stage. More than one step of oxidation is used to yield improved quality, the two or more steps being applied in accord with test units of experimental operation. By this means resistance to oxidation or decomposition at elevated temperature resulting in low carbon value is increased.

I do not limit my claims to the exact method or apparatus as illustrated. The described principles and steps are preferably varied to meet the requirements of a particular oil.

Modes of operation of my method are further schematically illustrated in Figs. 2 and 3 etc. In Fig. 2 is shown the simple method of rearranging petroleum. An evaporator 55, forming vapors of the petroleum to be treated as for example heavy oil. Vapors pass through contact zone 56 through which the treating agent is flowed. A generator 57 may be used to form and maintain the proper concentration of treating agent being comparable with vessels 16 and 17 of Fig. 1 and preferably including an electrolytic cell. The vapors are substantially condensed in system 58 which may discharge heavy oil and light hydrocarbons passing to a pressure control means. Cooler 59 reduces the temperature gradually and to yield the desired crystal form. Filter 60 may be used to separate wax from dewaxed oil. The temperature of the units are controlled within the limits indicated to form wax which may thus be isolated.

The formed and separated wax or wax of other source may be passed into evaporator 61 operating with contact zone 62, generator 63 and condenser 64 to yield a condensate which may be cooled in 65 to form a dewaxed oil separable in filter 66. The oil from condenser 64 or from filter 66 may be flowed to oxidizer 68 for mild oxidation and then to contact zone 68 whereat alkali metal treating agent is applied and residual treating agent and impurities separated in zone 69 to yield improved oil of high stability and high viscosity index. In some instances wax introduced into 61 is pretreated with a mild oxidant or else the oxidant is introduced with the wax in the evaporator whereat mild oxidation ensues which in such instance subsequent oxidation may be unnecessary for oil so produced for some purposes.

I claim:

1. The process which comprises treating wax from petroleum with a molten mass containing alkali metal at between about 250° C. and about 450° C. to rearrange portions of the wax into lubricating oil and lighter oil and to decrease its density while simultaneously increasing its viscosity index and rendering it substantially colorless, separating light oil so formed by distillation thereof, cooling residual heavy oil so formed to precipitate wax in large crystals of between about $\frac{1}{16}$ inch and one inch in greatest dimension, allowing the crystals to settle and decanting and separating a dewaxed oil therefrom which is possessed of a viscosity index substantially over 100 and of high stability.

2. The process which comprises contacting mineral wax in vapor form with alkali metal at between about 250° C. and about 450° C. for about a few minutes to rearrange the wax into oil of lubricating range of low density with a viscosity index of about 100 or above and a lighter oil, removing oil lighter than lubricating oil therefrom, cooling heavier oil to precipitate wax as crystals of between about a thirty-second of an inch and one inch in size and separating such wax to form dewaxed oil, mildly oxidizing the dewaxed oil to render unstable portions removable by subsequent treatment with alkali metal at elevated temperature and treating it with alkali metal at between about 200° C. and 400° C. to increase its resistance to oxidation and so forming a stable oil of high viscosity index and low pour point from the wax so treated.

3. In forming oil from wax the process which comprises contacting the wax in fluid form with a molten mass containing alkali metal at between about 250° C. and 450° C, to promote molecular rearrangement of the wax and so forming oil from a portion of the so treated wax.

4. The process of producing improved lubricating oil which comprises contacting hydrocarbons of lubricating oil boiling range with alkali metal at temperatures of the order of 200° to 400° C. to rearrange the structure thereof, passing said oil in contact with an absorptive surface which will absorb impurities formed by the alkali metal, separating light oil fractions cooling and chilling the heavy oil to separate wax and separating a dewaxed oil of desirable characteristics.

5. A wax forming process comprised of contacting dewaxed oil with alkali metal at between about 250° C. and 350° C. to promote rearrangement and form light portions from heavy unstable portions and to remove substantially all of the color while decreasing the density of the oil and forming wax, separating purified oil from the metal and its associated impurities and the light portions, cooling the decolorized oil of increased viscosity index so formed to precipitate wax and removing said wax to form an improved oil of lower pour point than the oil treated and of greater stability and of higher viscosity index.

6. The process which comprises vaporizing a portion of heavy oil, treating oil residual to the vapors with alkali metal at between about 200° C. and 400° C. to alter impurities, to rearrange an unstable portion of said oil into light hydrocarbons and to increase the viscosity index of the heavier portions, separating light portions from the heavier portion, contacting the so treated oil with an adsorptive surface which will adsorb impurities of the oil which have been altered by the metal, separating so purified oil and cooling it and separating wax therefrom.

7. The process which comprises treating heavy oil with alkali metal at between about 300° C. and 500° C. to form wax from portions thereof, separating the wax so formed from oil so treated, treating wax so formed by action of molten alkali metal on said oil with a molten mass containing alkali metal at between about 200° C. and 450° C. and so forming oil from the said wax.

8. The process which comprises treating heavy oil with alkali metal at between about 300° C. and 500° C. to form wax from portions thereof, separating the wax so formed from oil so treated, treating wax so formed by action of molten alkali metal on said oil with a molten mass containing alkali metal at between about 200° C. and 450° C. and so forming oil from the said wax and mildly oxidizing oil so formed to render unstable portions removable by alkali metal at elevated temperature and applying alkali metal at a temperature between about 300° C. and 400° C. to so remove oxidized portions and to form a stable oil as of high viscosity index.

9. The process which comprises treating oil containing wax with alkali metal at between 200° C. and 400° C. to remove impurities, to decolorize the oil, to raise its viscosity index and to form a substantial portion of light hydrocarbons of about a half of the molecular weight from unstable portions of the oil, removing the light hydrocarbons by distillation, dewaxing oil so treated and mildly oxidizing the oil to render unstable portions removable by subsequent application of alkali metal at elevated temperature and treating the so oxidized oil with alkali metal between about 200° C. and 400° C. to remove oxidized unstable portions, and separating purified oil from the metal and its collected impurities to form an oil of low pour point and high viscosity index which oil is more resistant to oxidation than the untreated oil.

10. The process of refining mineral oil which comprises treating wax containing oil with alkali metal at between 200° C. and 400° C. producing a substantially colorless oil of a viscosity index in excess of 100 and lower density, slowly cooling the so treated oil producing colorless wax crystals of between about one thirty-second of an inch and about one inch in size and separating the crystals from oil so purified by settling.

11. The process which comprises decolorizing wax-containing oil of a viscosity index of about 100 by contacting it with alkali metal at between about 250° C. and 450° C. while rendering it substantially and nearly colorless, cooling said nearly colorless oil so as to form from about 1% to about 10% of solid matter as colorless crystals and producing therefrom colorless wax crystals of above about a quarter of an inch in size.

12. In treating wax-containing oil by alternately treating it by mild oxidation to render unstable portions removable by alkali metal at elevated temperature and then treating it by such alkali metal to remove altered unstable portions the process which comprises in combination two steps of treating with molten mass containing alkali metal in which the metal is of higher concentration in the second and which are at between about 200° C. and 400° C. and two steps of controlled mild oxidation and a step of dewaxing and wherein the dewaxing step is after one stage of metal treatment while the oxidation is prior to the second stage of metal treatment.

13. In treating waxy oil the process which comprises mildly oxidizing the oil to alter unstable portions and render them removable by application of alkali metal at elevated temperature and then treating the oil at between 200° C. and 400° C. with molten mass containing alkali metal to increase the viscosity index, remove color, crack unstable portions and to alter and remove oxidized portions, and then removing cracked portions and separating purified oil from residue containing metal, and then dewaxing the oil to produce an oil which is more resistant to oxidation, of lower carbon value, of lower pour point, of lower color and of higher viscosity index.

14. A new composition of matter comprised of colorless crystals of wax contained in substantially colorless oil possessed of a viscosity index of about 100.

JUSTIN F. WAIT.